(12) United States Patent
Endres et al.

(10) Patent No.: US 7,666,493 B2
(45) Date of Patent: Feb. 23, 2010

(54) LOCALLY REINFORCED CORE STRUCTURE FOR COMPOSITE SANDWICH STRUCTURE AND METHOD OF PRODUCING THE SAME

(75) Inventors: Gregor Christian Endres, Bayreuth (DE); Hans-Juergen Weber, Verden (DE)

(73) Assignee: Airbus Deutschland GmbH, Hamburg (DE)

(*) Notice: Subject to any disclaimer, the term of this patent is extended or adjusted under 35 U.S.C. 154(b) by 161 days.

(21) Appl. No.: 11/083,386

(22) Filed: Mar. 17, 2005

(65) Prior Publication Data

US 2005/0208273 A1    Sep. 22, 2005

Related U.S. Application Data

(60) Provisional application No. 60/600,066, filed on Aug. 9, 2004.

(30) Foreign Application Priority Data

Mar. 17, 2004    (DE) ................. 10 2004 013 146

(51) Int. Cl.
| | |
|---|---|
| B32B 1/00 | (2006.01) |
| B32B 3/20 | (2006.01) |
| B32B 3/28 | (2006.01) |
| B32B 3/30 | (2006.01) |
| B32B 3/10 | (2006.01) |
| E04C 2/54 | (2006.01) |
| E04C 2/34 | (2006.01) |

(52) U.S. Cl. .................. 428/174; 428/131; 428/137; 428/166; 428/178; 428/188; 428/181; 52/793.1; 52/783.1; 52/783.17; 52/787.1

(58) Field of Classification Search .................. 428/181, 428/188, 166, 178, 116, 117, 131, 137, 182, 428/174; 52/787.1, 790.1, 793.1, 783.1, 52/783.17
See application file for complete search history.

(56) References Cited

U.S. PATENT DOCUMENTS

| | | | | |
|---|---|---|---|---|
| 2,569,826 | A | * 10/1951 | Packard | ................ 411/80.1 |
| 2,576,530 | A | * 11/1951 | Medal | ..................... 52/588.1 |
| 2,963,128 | A | * 12/1960 | Rapp | ........................ 428/594 |
| 3,305,996 | A | 2/1967 | Shapiro | |
| 3,886,023 | A | 5/1975 | Deplante | |

(Continued)

FOREIGN PATENT DOCUMENTS

DE          2 316 061          10/1973

(Continued)

*Primary Examiner*—David R Sample
*Assistant Examiner*—Catherine Simone
(74) *Attorney, Agent, or Firm*—W. F. Fasse; W. G. Fasse (57) ABSTRACT

Producing a composite structure involves providing a core structure having a folded configuration with fold valleys forming open channels extending along the valleys, and then forming a local reinforcement zone in the core structure itself, before applying any cover layer onto the core structure. The method may further involve applying two cover layers on two opposite sides of the core structure to form a composite sandwich structure, after the local reinforcement zone has been formed in the core structure. A core structure preferably has a local reinforcement zone formed by two molded bodies, e.g. of cured synthetic resin or foam, arranged form-fittingly on the opposite sides of the core.

30 Claims, 8 Drawing Sheets

U.S. PATENT DOCUMENTS

| | | | |
|---|---|---|---|
| 3,887,990 A * | 6/1975 | Wilson | 29/450 |
| 4,001,474 A | 1/1977 | Hereth | |
| 4,034,135 A * | 7/1977 | Passmore | 428/184 |
| 4,265,688 A * | 5/1981 | Gorski | 156/73.1 |
| 5,316,828 A * | 5/1994 | Miller | 428/182 |
| 5,378,099 A | 1/1995 | Gauron | |
| 5,750,235 A * | 5/1998 | Yoshimasa | 428/182 |
| 6,187,123 B1 | 2/2001 | Chenier et al. | |
| 6,245,407 B1 | 6/2001 | Wang et al. | |
| 6,713,008 B1 | 3/2004 | Teeter | |
| 6,837,018 B1 | 1/2005 | Hagel et al. | |
| 2003/0087049 A1 | 5/2003 | Hachenberg et al. | |
| 2005/0204693 A1 | 9/2005 | Endres et al. | |
| 2005/0206035 A1 | 9/2005 | Endres et al. | |
| 2005/0208274 A1 | 9/2005 | Endres et al. | |

FOREIGN PATENT DOCUMENTS

| | | |
|---|---|---|
| DE | 89 15 724 | 5/1991 |
| DE | 43 21 316 | 1/1995 |
| DE | 297 12 684 | 11/1998 |
| DE | 101 46 201 | 4/2003 |
| DE | 101 54 063 | 5/2003 |
| EP | 0 264 870 | 4/1988 |
| EP | 0 273 515 | 9/1990 |
| EP | 0 589 054 | 3/1994 |
| EP | 06344449 | 12/1994 |

* cited by examiner

LOCALLY REINFORCED CORE STRUCTURE FOR COMPOSITE SANDWICH STRUCTURE AND METHOD OF PRODUCING THE SAME

CROSS-REFERENCE TO RELATED APPLICATION

This U.S. Non-Provisional Application claims the benefit under 35 U.S.C. §119(e) of U.S. Provisional Application 60/600,066, filed on Aug. 9, 2004, the entire disclosure of which is incorporated herein by reference.

PRIORITY CLAIM

This application is based on and claims the priority under 35 U.S.C. §119 of German Patent Application 10 2004 013 146.5, filed on Mar. 17, 2004, the entire disclosure of which is incorporated herein by reference.

FIELD OF THE INVENTION

The invention relates to a method for reinforcing a core structure having a folded cell configuration for a composite sandwich structure. The invention further relates to a locally reinforced core of a composite sandwich structure.

BACKGROUND INFORMATION

Due to their extraordinarily good ratio of stiffness or strength to density, core composites, i.e. composite sandwich structures having a lightweight core, have a broad range of application especially in the field of aircraft construction.

Well-known conventional core composites are generally formed of an upper and a lower cover layer or cover ply, between which is located, for example, a honeycomb-type core structure formed of vertically extending cells with a hexagonal cross section, for increasing the stiffness of the resulting composite sandwich structure.

For example metallic corrosion-protected aluminum foils, or non-metallic materials, such as Nomex®- or Kevlar®/N636-paper for example, are used for forming the core structure. Both the Nomex®-paper as well as the Kevlar®/N636-paper are coated with phenolic resin in a submersion process for increasing the mechanical strength thereof.

The local stiffening or reinforcement of a core structure as represented by the above described true honeycomb structure is not problematic. Due to the small-volume repeat units represented by the individual hexagonal cells extending perpendicular to the cover layers, a reinforcement material can be filled, pressed, foamed, poured or cast locally into the intended reinforcement zone, and is confined within the pertinent cells without spreading uncontrollably throughout a larger area of the interior of the core. The stiffening material may, for example, be a curable synthetic plastic material, for example in a synthetic resin and/or a synthetic plastic foam. In order to enable a connection of the core composite to other components, the core composite can be bored in the area of the local reinforcement zone, so that securing elements or fixtures can be securely mounted to the bored hole of the reinforcement zone.

If necessary, through the use of relevant known methods, a securing or mounting element, for example an insert nut or some other insert, can be introduced into the core composite. Alternatively, the securing element can also be introduced without previous reinforcement of the core composite according to relevant known methods.

In contrast to the above described true honeycomb-type core composites, in which a spatial limitation is always provided by the relatively small, individual cells extending perpendicular to the cover layers, new types of core composites, especially formed of three-dimensional folded comb or cell structures, comprise an open or drainable structure. Namely, such pleated or folded core structures include fold or pleat valleys that form open channels extending continuously in the plane of the composite structure, i.e. along or parallel to the cover layers from edge-to-edge of the composite structure. Thus, the core channels of such a core composite extend open and unobstructed through large areas (or even along the entire length or width) of the finished composite sandwich. Thereby, for example, it is possible to guide various types of lines (e.g. electrical lines, hydraulic lines, water lines, air lines, etc.) through the core composite without previously having to cut or machine a passage therethrough while impairing the mechanical properties of the core composite.

If, for the reinforcement of the above described drainable core structures, a pasty or viscous hardenable material is introduced into the core, depending on the viscosity thereof; it can more or less uncontrolledly spread out throughout each affected core channel of the open core structure, and thus laterally unbounded throughout large areas of the composite sandwich.

Similar considerations pertain for bored holes introduced into the finished core composite. In contrast to true honeycomb structures, in which fundamentally only a limited number of structural units are opened with a bored hole, and thus introduced substances are always spatially limited within the affected cells, viscous or pasty substances can spread out uncontrollably over larger distances in open drainable core structures.

Therefore the standard methods according to the state of the art are not usable for producing spatially limited reinforcements and for integrating securing elements in open drainable core structures.

SUMMARY OF THE INVENTION

It is an object of the invention to provide a method for reinforcing open core structures, especially folded comb or cell cores, adapted for fabricating core composites or composite sandwich structures provided on both sides with cover layers. Another object of the invention is to provide a core composite locally reinforced in such manner. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a method of producing a composite structure comprising: providing a core structure having a folded configuration with fold valleys forming open channels extending therealong; and forming a local reinforcement zone in the core structure before applying any cover layer on the core structure to produce a composite sandwich structure. Cover layers may thereafter optionally be applied on the opposite sides of the core to produce a composite sandwich structure.

The above objects have further been achieved according to the invention in a core structure adapted for producing a composite sandwich structure by later applying cover layers on opposite sides of the core structure. The core structure includes a core having a folded configuration with fold valleys forming open channels extending therealong parallel to the major plane of the core structure (wherein the "plane"

may be not only a planar "plane" but alternatively a "curved plane"), and a local reinforcement zone in or on the core. The core structure does not have the cover layers on the opposite sides of the core.

The targeted reinforcement of open or drainable core structures, intended for the formation of core composites provided on both sides with cover layers, is rapidly and easily possible, because at least one local reinforcement zone is formed in the area of the core structure in accordance with the inventive method. The introduction of reinforcements in open or drainable core structures is possible, because at least one local reinforcement zone is formed in the area of the core structure in accordance with the inventive core composite.

According to a further development of the inventive method, at least one securing or mounting element or a bored hole is introduced in the area of the local reinforcement zone. Thereby, a securing or mounting of the core composite or composite sandwich structure to existing supporting constructions, as well as a connection of plural core composites to one another, is made possible. In that regard, the reinforcement zone becomes a spatial limitation or boundary for the pasty and viscous substances used for bonding the securing element on the core composite.

Further developments and advantageous embodiments of the invention are set forth in the further patent claims. Further advantages arise from the following detailed description of the invention.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1:
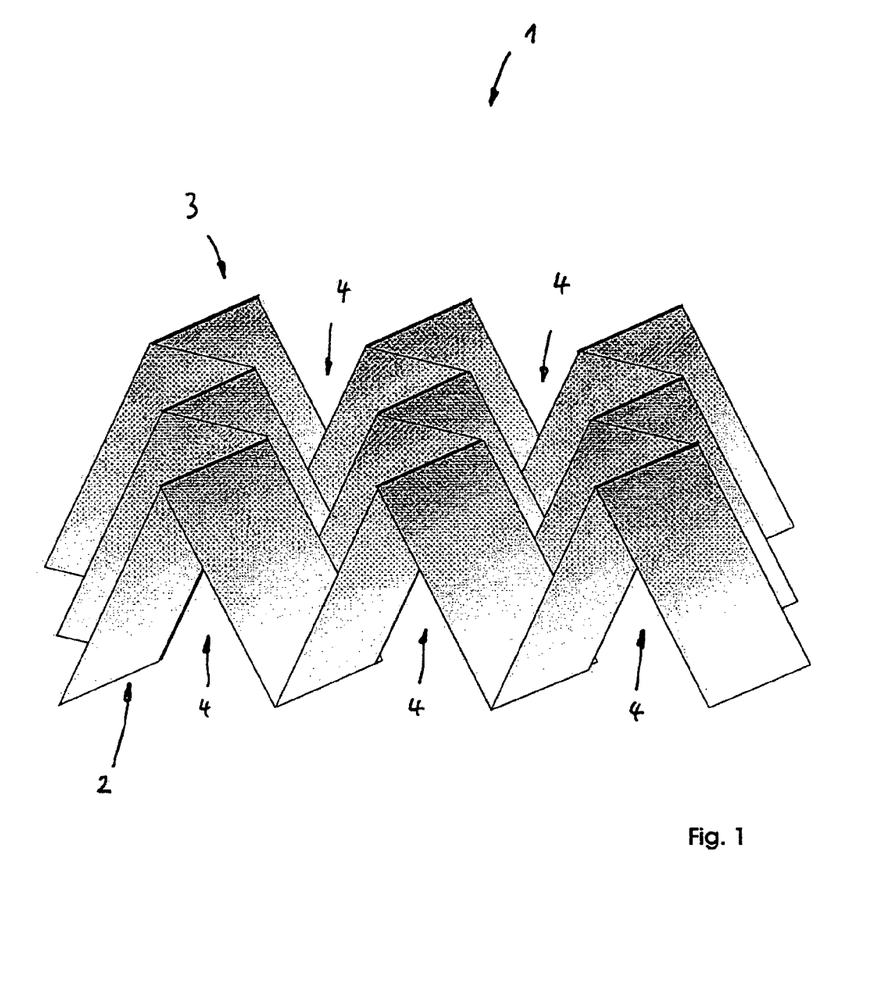
FIG. 1 is a perspective view of an open core structure of a core composite, that is embodied as a folded comb or cell structure.

FIG. 1 shows an example of an open or drainable three-dimensional core structure 1 for the formation of a core composite or composite sandwich structure. The core structure 1 is embodied here as a folded cell comb having a folded configuration with fold or pleat ridges and fold or pleat valleys forming open channels extending along the valleys, whereby the fold ridges and the fold valleys extend along fold lines that proceed along a zig-zag course. Namely, through-going zig-zag channels 4 are recognizable on a bottom side or surface 2 and a top side or surface 3 of the core structure 1. The channels 4 may, for example, be used for guiding lines of all types (e.g. hydraulic lines, electrical lines, etc.) through the core structure 1, whereby no bored holes or openings, which mean losses in the mechanical properties of the core composite, need to be introduced.

The core structure 1 can be formed of metal and corrosion-protected aluminum foils, for example. Alternatively, for example, Nomex®- or Kevlar®/N636-paper, which is coated or impregnated with phenolic resin in a submersion process for example, can be used to fabricate the folded or pleated core structure 1, using any conventionally known techniques.

Figure 2:
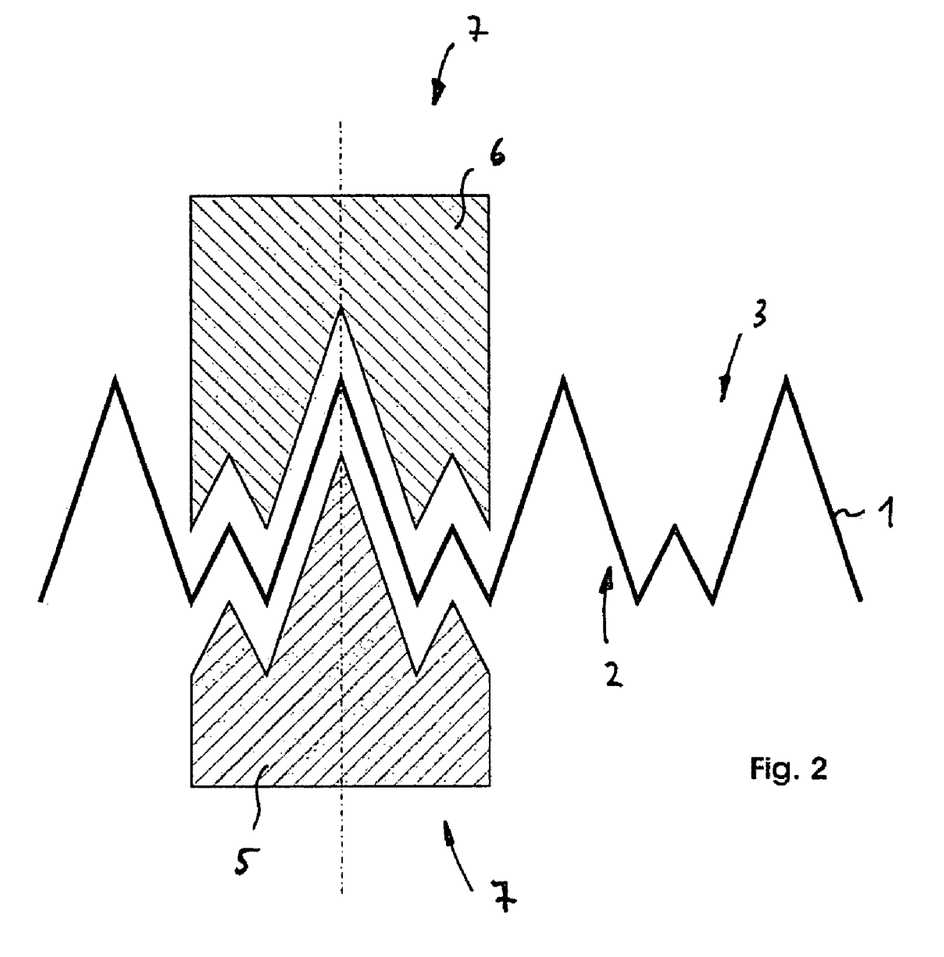
FIG. 2 is a sectional view representing the formation of a local reinforcement zone in an open core structure according to a first method variant.

FIG. 2 shows the formation of a local reinforcement zone in an open core structure according to an exemplary first variant of the inventive method. The core structure 1 has the bottom side or surface 2 and the top side or surface 3 as mentioned above. First, a bottom formed or molded body 5 is applied onto the bottom side 2 of the core structure 1 and a top formed or molded body 6 is applied onto the top side 3 of the core structure 1 in the area in which a local reinforcement zone is to be formed. For this purpose, the formed bodies 5, 6 are at least area-wise, i.e. in certain areas, embodied form-fitting with the bottom as well as top side 2, 3 of the core structure 1. The formed bodies 5, 6 are, for example, glued, cast, foamed, potted, welded, brazed, or soldered onto or into, or otherwise connected in a force-transmitting manner with the core structure 1.

An exemplary possibility for producing the formed bodies 5, 6 is described in the following. For producing the formed bodies 5, 6, core impressions are taken of the pertinent areas of the top and/or of the bottom side 2, 3 of the core structure 1 in which local reinforcement zones 7 are to be produced. Due to their good separation effect, for example silicone materials, especially silicone elastomers, such as the forming material Aircast3700® for example, are suitable for the fabrication of the core impressions. By means of these core impressions, molds are prepared, from which the formed bodies 5 and 6 are then produced in an intermediate step. For this purpose, for example, a suitable synthetic plastic material, especially a curable synthetic resin and/or a curable synthetic plastic foam, is introduced into the core impressions. Besides the possibility of producing the utilized core molds from materials that already have a sufficient separation or release effect, molds of aluminum or steel, for example, which have an insufficient separation or release effect in the unmolding of the formed bodies, can be coated with separating layers, for example of PTFE. Thereby the formed bodies 5, 6 can be formed quickly, simply and with the required accuracy for the production of the form-fitting connection between the core structure 1 and the formed bodies 5, 6 through the introduction of a suitable material into the fabricated molds.

Synthetic plastic materials, especially curable synthetic resins and/or curable synthetic plastic foams, for example, may be used as the material for the formed bodies 5, 6. The selection of the material for the formed bodies 5, 6 especially depends on the feature that a force-transmitting connection is producible in the connection thereof with the core structure 1 for the formation of the local reinforcement zone 7.

Next, cover layers that are not shown in detail in FIG. 2 are applied on both sides onto the core structure 1 to fabricate the finished or complete core composite or composite sandwich structure. Through the introduction of the local reinforcement zone 7, on the one hand there arises an increase of the compressive strength of the core composite in this area. Moreover, on the other hand, the local reinforcement zone 7 makes it possible to achieve the integration of securing elements into the core structure 1 or the core composite, in a simple manner with simple means.

Figure 3:
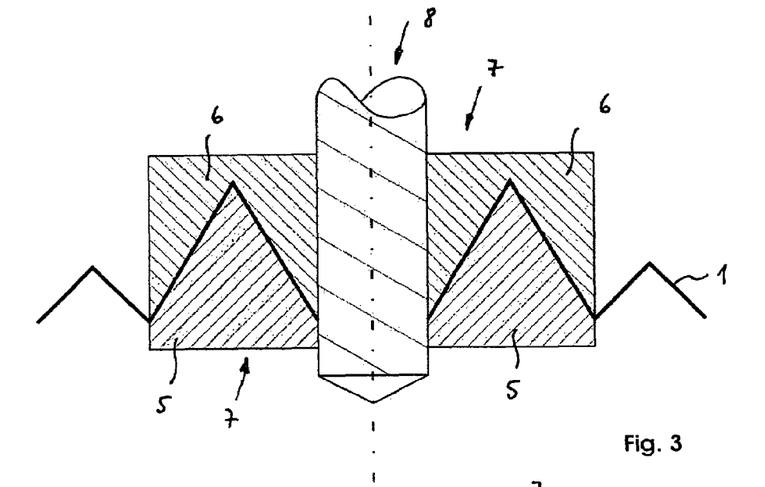
FIGS. 3-5 are three sectional views showing three successive stages of the integration of a securing element in a local reinforcement zone formed according to the first method variant.
Figure 4:
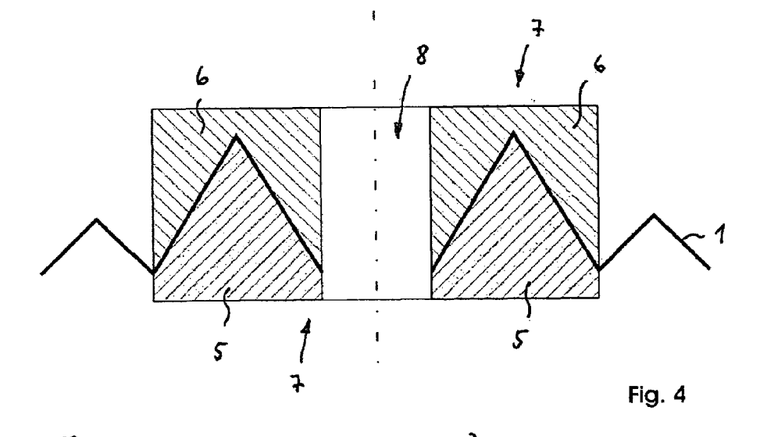
Figure 5:
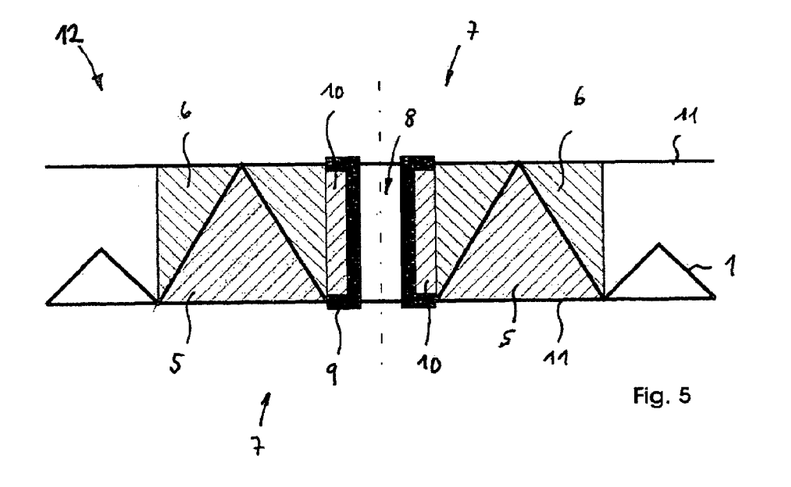

FIGS. 3 to 5 show the exemplary integration of a securing element in the local reinforcement zone 7 formed according to the first method variant.

FIGS. 3 and 4 show, in the manner of an example, the introduction of a bored hole 8 into the local reinforcement zone 7 formed of the formed bodies 5 and 6 as well as the associated section of the core structure 1. In this regard it is not absolutely necessary to introduce a rotationally symmetrical bored hole into the local reinforcement zone 7. Instead of a bored hole, any desired or arbitrary recesses or openings can be provided within the local reinforcement zone 7. Alternatively, a bored hole can be carried out after application of the cover plies or cover layers.

If the stiffening or reinforcement serves as a preparation for the integration of a securing element, then the material remaining in the local reinforcement zone 7 after introduction of the recess or hole serves as a barrier to prevent pasty or viscous substances, which are used for securing the insert nut, from being able to uncontrolledly spread-out throughout the affected core channels of the core composite.

FIG. 5 shows the introduction of a securing element 9 into the local reinforcement zone 7 formed of the formed bodies 5, 6. For this purpose, the securing element 9 is introduced into the bored hole 8 and is welded-in, soldered-in, brazed-in, foamed-in, cast-in, potted-in or glued-in, especially with a core filler material 10 or a special adhesive.

A synthetic plastic material, especially a curable synthetic resin and/or a synthetic plastic foam may, for example, be used as the core filler material 10. Especially preferably, for example, curable epoxide resins or polyester resins as well as synthetic plastic foams curable to hard foams can be used.

In further method steps not shown in detail in FIGS. 3 to 5, the height of the formed bodies 5, 6, after the connection thereof with the core structure 1, is adapted or matched to the height of the core structure 1 through a mechanical processing or machining. Finally, both cover layers 11 are applied in a known manner onto the core structure 1 for forming the core composite or composite sandwich structure 12.

In a variant of the method not shown in detail in the drawings, the formed bodies 5, 6 can be provided with bored holes already during or after the fabrication thereof. In this case, then a bored hole will only still have to be introduced into the core structure 1 in the pertinent area. If one selects the diameter of the bored hole in the core structure 1 smaller than the diameter of the bored holes in the formed bodies 5, 6, an additional mechanical fixing of the core structure 1 is achieved in the integration of a securing element into the bored hole 8.

FIGS. 6 to 9 show the exemplary course or progression of a second variant of the inventive method for the formation of a local reinforcement zone 21 in an open or drainable core structure 13.

Figure 6:
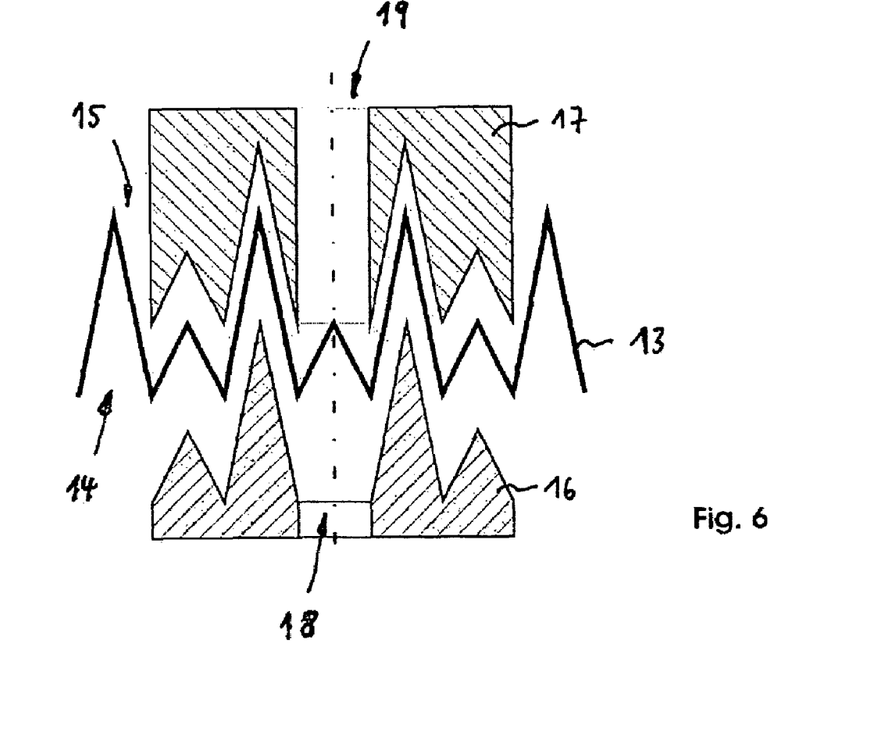
FIGS. 6-9 are four sectional views showing four successive stages of the formation of a local reinforcement zone in an open core structure according to a second method variant.
Figure 7:
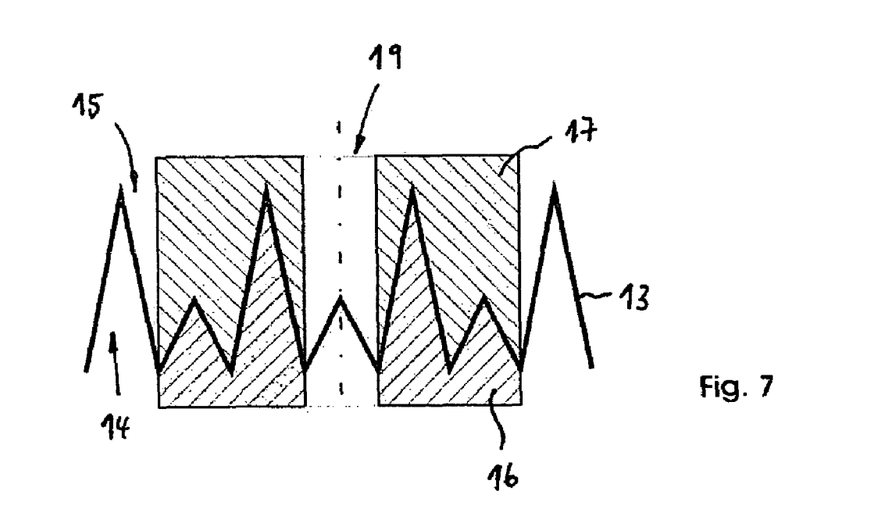

FIGS. 6 and 7 show an open core structure 13 in a schematic cross-sectional view with the bottom side 14 as well as the top side 15. Initially, in a first method step, a bottom and a top core impression 16, 17 are laid onto corresponding sides of the core structure 13. The core impressions 16, 17 lie preferably at least area-wise, i.e. in certain areas at and around the intended reinforcement zone, in a form-fitting manner on the core structure 13.

By means of conventionally known methods, the core impressions 16, 17 are removed from the core structure 13. In this regard, the core impressions 16, 17 are preferably at least partially formed of a material that is easily-separable from the core structure 13. The core impressions 16, 17 may, for example, at least partially be fabricated of a silicone elastomer, a silicone rubber or the like. Alternatively, especially for reasons of durability, a metallic material is conceivable for the formation of the core impressions 16, 17, which is then provided with an anti-adhesion coating. Finally, the core impressions 16, 17 may, at least area-wise, also be covered with a separating lacquer or release film. Formed or shaped bored holes 18 are introduced into the core impressions 16, 17 and serve to form a spatial limitation or boundary 19.

Figure 8:
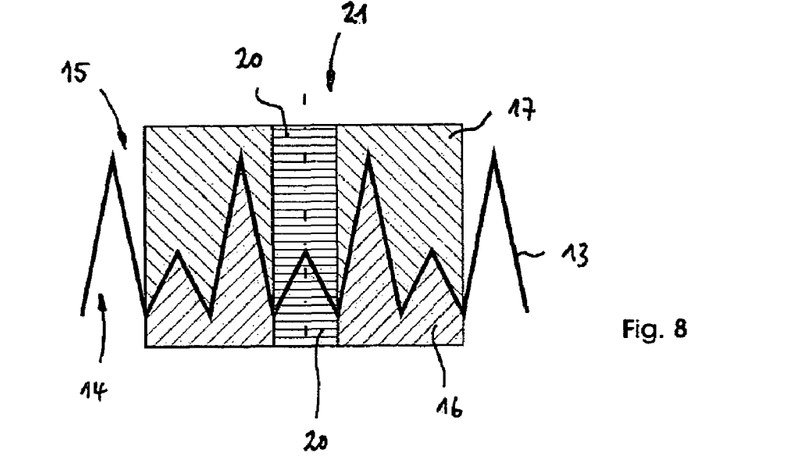
Figure 9:
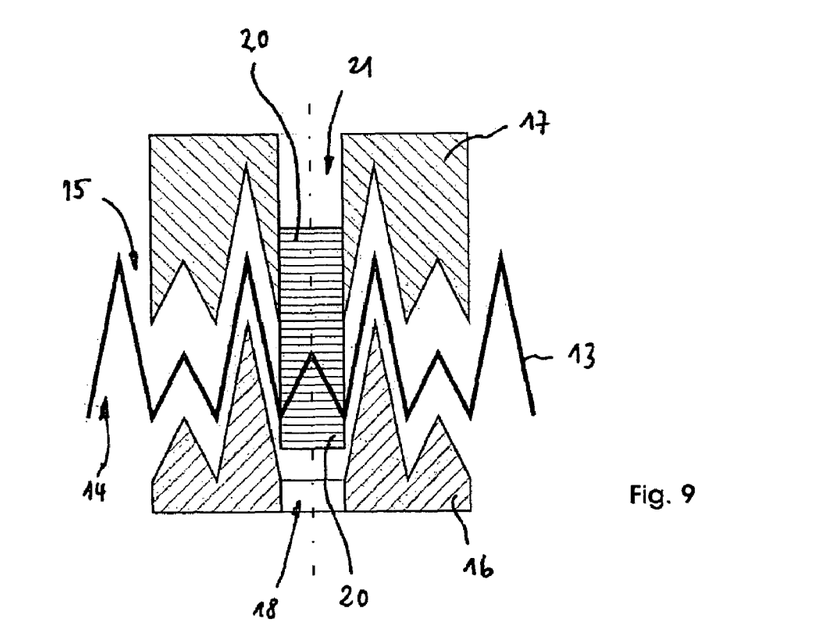

In FIG. 8, it is shown how a core filler material 20 is introduced into the spatial limitation 19 for the formation of a local reinforcement zone 21 in a further method step. Once again, a synthetic plastic material can be used as the core filler material 20. Next, the thusly-formed local reinforcement zone 21 is un-molded (see FIG. 9) through the lifting-off of the core impressions 16, 17. Once again, an increase of the local compressive strength in this area of the core structure 13 is achieved by the local reinforcement zone 21, whereby the mechanical strength of a core composite formed using the reinforced core structure is increased.

Figure 10:
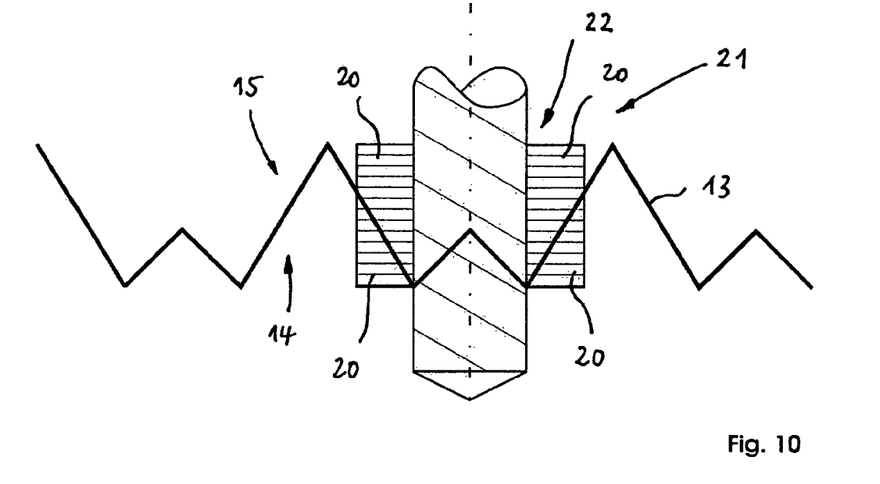
FIGS. 10-11 are two sectional views showing two successive stages of the integration of a securing element in a local reinforcement zone formed according to the second method variant.
Figure 11:
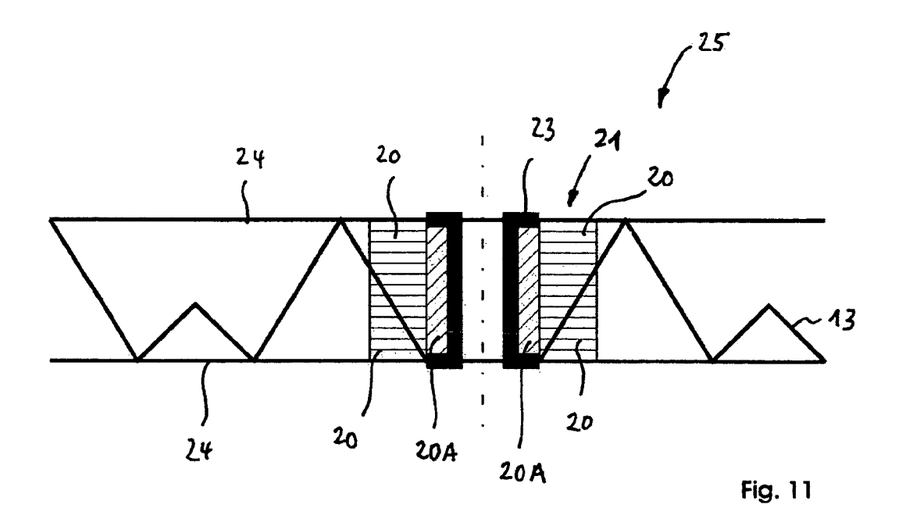

FIGS. 10 to 11 show, as an example, the integration of a securing element into a local reinforcement zone 21 formed according to the second method variant. As shown in the manner of an example in FIG. 10, the reinforcement zone 21 in the core structure by itself (i.e. without cover layers) is provided with a recess or opening, especially a bored hole 22, for the integration of a securing element 23. Alternatively, the bored hole 22 can be introduced after the application of one or both cover layers onto the core structure.

If the local reinforcement zone 21 or the stiffening serves as a preparation for the integration of a securing element 23, then the reinforcing material remaining after the introduction of the recess, that is to say the local reinforcement zone 21 provided with the bored hole 22, serves as a barrier to prevent the pasty or viscous substances used for securing the insert nut from being able to uncontrolledly spread-out throughout the open channels of the core composite. With the known methods, the securing element 23 can be integrated into the local reinforcement zone 21, e.g. by being glued or potted or otherwise bonded into the hole 22 with an additional bonding substance 20A (see FIG. 11). Finally, cover layers 24 are applied on both sides onto the core structure 13 for the formation of the core composite 25.

Figure 12:
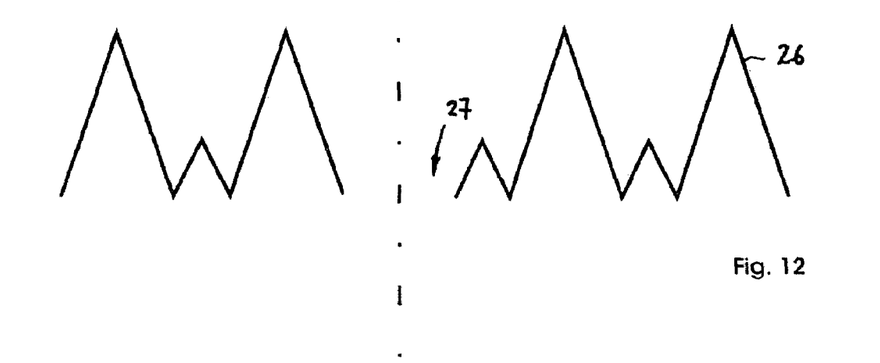
FIGS. 12-14 are three sectional views showing three successive stages of the formation of a local reinforcement zone in an open core structure according to a third method variant.
Figure 13:
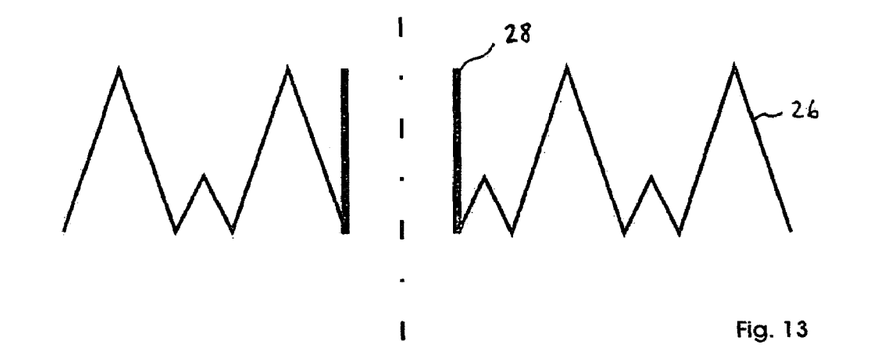
Figure 14:
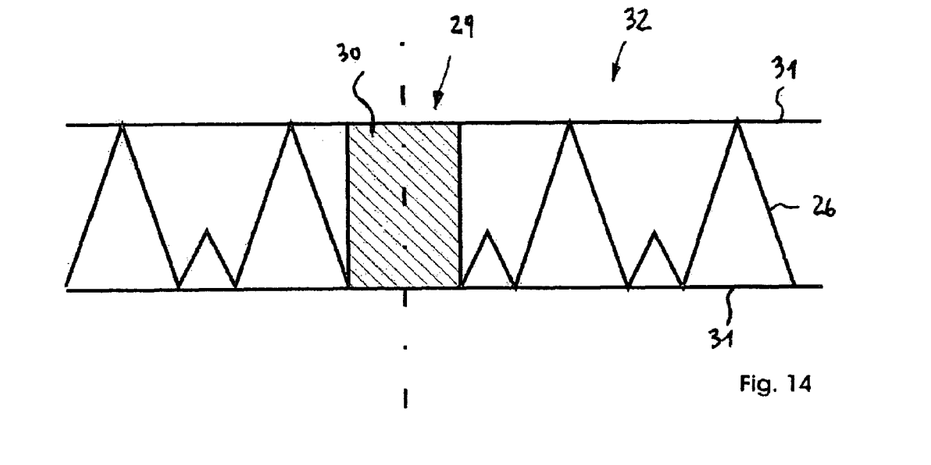

As an example, FIGS. 12 to 14 show the formation of a local reinforcement zone in an open core structure according to a third method variant of the inventive method.

Once again, a core structure 26 is illustrated in FIGS. 12 to 14. First, a bored hole 27 is introduced into the core structure 26 in the area of a line of symmetry (see FIG. 12). In the illustrated example embodiment as identified by FIG. 13, the bored hole 27 serves for receiving a sleeve 28, which represents a spatial limitation or boundary for the formation of a local reinforcement zone 29. The sleeve 28 can be glued-in, foamed-in, cast-in, welded-in, pressed-in, screwed-in or beat-in or otherwise connected within the bored hole 27 of the core structure 26.

For the formation of the local reinforcement zone 29, a core filler material 30 or the like is introduced into the sleeve 28 according to FIG. 14. For example, the core filler material 30 can be a curable synthetic resin and/or a synthetic plastic foam. After the introduction of the core filler material 30, the cover layers 31 are applied.

As has been described previously in the context of the explanations of the first two method variants, a securing element 9, 23 can be integrated into the local reinforcement zone 29. In that regard, the third method variant comprises the advantage, that, due to the sleeve 28, a spatial limitation exists from the beginning, which hinders the adhesive materials for the connection of the securing element and the core composite 32 from spreading-out.

Figure 15:
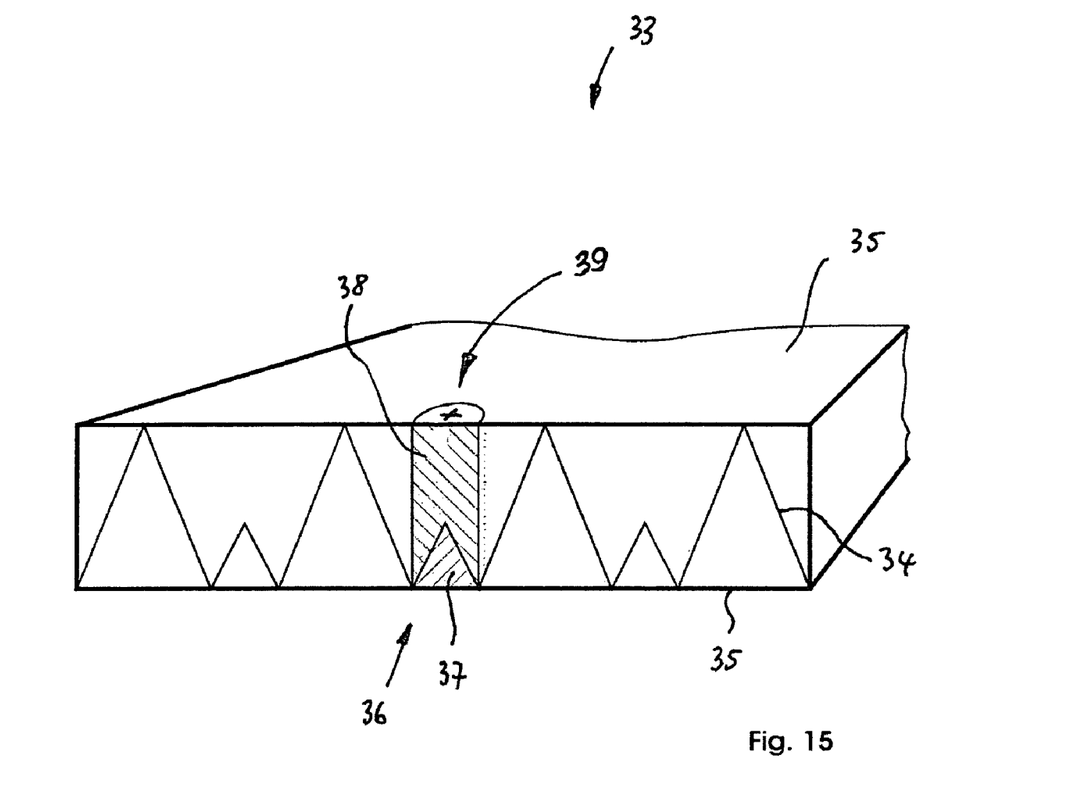
FIG. 15 is a perspective sectional view of a core composite formed by the method according to the invention.

FIG. 15 shows a core composite 33 according to the invention, produced according to the above described method, with a core structure 34. The core structure 34 is provided on both sides with cover layers 35. In this regard, the core structure 34 is embodied as an open three-dimensional folded comb or cell structure. In the illustrated example embodiment of FIG. 15, the core composite 33 is provided, according to the invention, with a local reinforcement zone 36 that was formed before the application of the two cover layers 35 onto the core structure 34. Through the local reinforcement zone 36, among other things, the compressive strength of the thusly-formed core composite 33 in this area is improved. If necessary, the core composite 33 can be provided with any desired or arbitrary number of local reinforcement zones 36, in order to achieve the desired mechanical properties of the core composite 33 formed thereby.

One or more securing elements, not further shown in the illustration of FIG. 15, can be integrated into the local reinforcement zone 36. For example, bored holes, insert nuts, inserts or the like can be used as securing elements. In this regard, the formation of the local reinforcement zone 36 can be carried out according to one of the previously explained variants of the inventive method. Furthermore, to indicate the locations of the reinforcement zones 36 lying (initially hidden) under the cover layers 35, for example to guide the boring of holes or the mounting of securing elements in or on the reinforcement zones 36 through the cover layer 35, the surface of at least one cover layer 35 may be provided with any suitable markings 39 such as a perimeter circle and a central cross-hair at the pertinent locations as indicated generally in FIG. 15.

In the illustrated example embodiment of FIG. 15, the local reinforcement zone 36 is, for example, formed by a bottom formed body 37 as well as a top formed body 38. The formed bodies 37, 38 are embodied form-fitting to the surface structure of the core structure 34 and are connected both with the core structure 34 as well as the cover layers 35, particularly being glued, welded, foamed-in, cast-in, etc. Furthermore it is necessary to adapt or match the height of the formed bodies 37, 38, after the connection with the core structure 34, to the height of the core structure 34, so that the cover layers 35 can be applied onto the core structure 34. Thus, as shown in the drawing, the formed or molded bodies respectively have opposite planar surfaces that define a thickness of the core structure therebetween and that are positioned and adapted to receive the first and second cover layers respectively applied thereon. The formed bodies 37, 38 may, for example, be formed of a synthetic plastic material, especially a core filler material. Especially a curable synthetic resin and/or a curable synthetic plastic foam come into consideration as the core filler material.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A core structure for producing a composite sandwich structure having a local reinforcement zone therein by later applying respective first and second cover layers respectively on opposite first and second sides of said core structure,
    wherein said core structure includes a core having a folded configuration with fold valleys forming open channels extending therealong, and said local reinforcement zone permanently connected on said core,
    wherein said local reinforcement zone comprises, respectively as first and second reinforcements, a first molded body arranged form-fittingly and locally spatially limited on only a partial surface area on said core on said first side of said core structure, and a second molded body arranged form-fittingly and locally spatially limited on only a partial surface area on said core on said second side of said core structure,
    wherein said first and second molded bodies are respectively permanently connected to said core on said opposite first and second sides in a force-transmitting manner by respective permanent force-transmitting connections selected from a glued connection, a cast connection, a foamed connection, a potted connection, a welded connection, a brazed connection or a soldered connection;
    wherein said first and second molded bodies respectively have opposite planar first and second molded body surfaces that define a thickness of said core structure therebetween and that are positioned and adapted to receive said first and second cover layers respectively applied onto said opposite planar first and second molded body surfaces, and
    wherein said core structure does not have said first cover layer on said first side of said core structure and does not have said second cover layer on said second side of said core structure.

2. The core structure according to claim 1, wherein said molded bodies respectively consist of a cured synthetic resin and/or a cured synthetic plastic foam.

3. The core structure according to claim 1, further comprising a securing element secured into said local reinforcement zone.

4. The core structure according to claim 3, wherein said securing element comprises an insert nut.

5. The core structure according to claim 3, wherein said securing element includes a hole passing therethrough and through a thickness of said core structure.

6. The core structure according to claim 1, wherein said molded bodies consist of a core filler material that comprises a curable synthetic resin and/or a curable synthetic plastic foam.

7. The core structure according to claim 1, wherein said first molded body and said second molded body are arranged in registration alignment opposite one another respectively on said first side and said second side of said core structure, with said core received form-fittingly between said first and second molded bodies.

8. The core structure according to claim 1, wherein a hole passes continuously straight through said first and second molded bodies and through said core between said first and second molded bodies.

9. The core structure according to claim 1, wherein said fold valleys and said open channels extend longitudinally parallel to a major plane of said core structure.

10. The core structure according to claim 1, wherein said folded configuration further has fold ridges between said fold valleys, and wherein said fold ridges and said fold valleys extend along fold lines.

11. The core structure according to claim 10, wherein said fold lines each respectively extend along a zig-zag course.

12. A composite sandwich structure comprising said core structure according to claim 1, and further comprising said first and second cover layers applied on said opposite first and second sides of said core structure, and at least one marking that is so located on an outer surface on at least one of said cover layers so as to thereby indicate a location of said local reinforcement zone which is hidden from view under said cover layers.

13. The composite sandwich structure according to claim 12, wherein said fold valleys and said channels each respectively extend longitudinally along said first or second cover layer.

14. The composite sandwich structure according to claim 12, further comprising a securing element secured in said local reinforcement zone.

15. The composite sandwich structure according to claim 12, further comprising a bored hole in said local reinforcement zone.

16. The composite sandwich structure according to claim 15, further comprising an insert element secured in said bored hole by gluing, foaming, potting, casting, welding, brazing or soldering.

17. A method of producing a composite sandwich structure using the core structure according to claim 1, said method comprising the steps:
a) providing said core structure including said core having said folded configuration with said fold valleys forming said open channels extending therealong; and
b) before applying any cover layer on said core structure to produce said composite sandwich structure, forming said local reinforcement zone in said core of said core structure, by providing said first molded body form-fittingly on said first side of said core structure and providing said second molded body form-fittingly on said second side of said core structure opposite said first formed body and connecting said molded bodies with said core by gluing, foaming, potting, casting, welding, brazing or soldering said molded bodies onto said core.

18. The method according to claim 17, further comprising, after said step b), an additional step of applying said first and second cover layers respectively on said opposite first and second sides of said core structure to produce said composite sandwich structure.

19. The method according to claim 17, further comprising, after said providing of said molded bodies, a step of forming a hole through said molded bodies and said core structure together in a single hole-forming process.

20. The method according to claim 17, further comprising: prefabricating said molded bodies respectively with a hole passing therethrough before said providing of said molded bodies in or on said core structure, and forming a hole through said core structure to communicate with said hole passing respectively through said molded bodies after said providing of said molded bodies in or on said core structure.

21. The method according to claim 17, wherein said providing of said molded bodies comprises forming a core impression of at least a selected area of said core structure, producing a mold from said core impression, and introducing a synthetic plastic core filler material into said mold so as to form thereof respectively one of said molded bodies.

22. The method according to claim 17, wherein said forming of said local reinforcement zone comprises introducing a spatial limiting structure into or onto said core structure, and then introducing a core filler material into said spatial limiting structure so as to be spatially confined therein to form thereof a respective one of said molded bodies.

23. The method according to claim 22, further comprising producing at least one core impression of at least a selected area of said core structure to form said spatial limiting structure of said at least one core impression, and forming a through-going hole through said at least one core impression.

24. The method according to claim 22, wherein said core filler material comprises a curable synthetic resin and/or a curable synthetic plastic foam.

25. The method according to claim 22, further comprising curing and/or hardening said core filler material, then introducing a hole into said core filler material and said core structure, and then introducing and securing a securing element into said hole.

26. The method according to claim 25, wherein said securing element comprises an insert element and is secured into said hole by being glued, foamed, cast, potted, welded, brazed, soldered, pressed, screwed, or beaten thereinto.

27. The method according to claim 17, wherein said forming of said local reinforcement zone comprises introducing a recess into said core structure, introducing a sleeve into said recess so as to form a confined space in said sleeve in said recess, and introducing a core filler material into said confined space so as to form thereof a respective one of said molded bodies.

28. The method according to claim 27, wherein said recess is a bored hole, and said sleeve is a hollow cylinder.

29. The method according to claim 28, further comprising securing said hollow cylinder into said bored hole by being glued, foamed, cast, potted, welded, brazed, soldered, pressed, screwed, or beaten thereinto.

30. The method according to claim 28, further comprising introducing a securing element comprising an insert into said hollow cylinder, and securing said securing element into said hollow cylinder by being glued, foamed, cast, potted, welded, brazed, soldered, pressed, screwed, or beaten thereinto.

* * * * *

UNITED STATES PATENT AND TRADEMARK OFFICE
CERTIFICATE OF CORRECTION

| | | |
|---|---|---|
| PATENT NO. | : 7,666,493 B2 | Page 1 of 1 |
| APPLICATION NO. | : 11/083386 | |
| DATED | : February 23, 2010 | |
| INVENTOR(S) | : Endres et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 338 days.

Signed and Sealed this

Seventh Day of December, 2010

David J. Kappos
*Director of the United States Patent and Trademark Office*